United States Patent [19]

Yoshino et al.

[11] Patent Number: 4,702,570

[45] Date of Patent: Oct. 27, 1987

[54] STEREO-MICROSCOPE WITH TWO OBSERVATION OPTICAL SYSTEMS EACH INCLUDING A RIGHT ANGLE PRISM AND A ROOF RIGHT ANGLE PRISM PROVIDING BOTH ROTATION AND RELATIVE SEPARATION ADJUSTMENTS

[75] Inventors: Hisakazu Yoshino; Shinichi Nishimura; Kazutoshi Takagi, all of Tokyo, Japan

[73] Assignee: Tokyo Kogaku Kikai Kabushiki Kaisha, Tokyo, Japan

[21] Appl. No.: 817,931

[22] Filed: Jan. 10, 1986

Related U.S. Application Data

[63] Continuation of Ser. No. 637,503, Aug. 1, 1984, Pat. No. 4,601,550.

[30] Foreign Application Priority Data

Aug. 8, 1983 [JP] Japan .................. 58-143685
Aug. 8, 1983 [JP] Japan .................. 58-143686

[51] Int. Cl.$^4$ ............................................ G02B 21/22
[52] U.S. Cl. ................................. 350/516; 350/522; 350/145; 350/286
[58] Field of Search ............. 350/516, 515, 514, 522, 350/537, 513, 511, 507, 502, 145, 286, 287

[56] References Cited

U.S. PATENT DOCUMENTS 2,143,632  1/1939  Ott .................................... 350/515
4,012,110  3/1977  Schael et al. ..................... 350/145

FOREIGN PATENT DOCUMENTS 1098233   1/1961  Fed. Rep. of Germany ...... 350/145
3212691  10/1983  Fed. Rep. of Germany ...... 350/516

OTHER PUBLICATIONS

L. A. Fedin, "Modern Foreign Stereoscopic Microscopes", *Optical Technology*, vol. 37, No. 9, Sept. 1970, pp. 613-623.

*Primary Examiner*—Jon W. Henry
*Attorney, Agent, or Firm*—Browdy and Neimark

[57] ABSTRACT

A stereo-microscope is disclosed. It comprises a common objective lens system, a first and second imaging lens systems having optical paths parallel to that of the objective lens system producing intermediate images of an object, a first and second optical path deflecting devices arranged behind the respective imaging lens systems for deflecting the respective ejection bundle of rays outwardly relative to the optical path of the objective lens system, and a first and second ocular systems arranged behind the respective optical path deflecting device for observing the respective intermediate images. It is characterized in that a stereo angle $\omega$ which is to be decided depending on the base length between the first and second imaging lens systems and an observation angle $\theta$ which is defined between the observation optical paths of the first and second ocular systems are arranged to be equal. Another stereo-microscope is also disclosed. It comprises an objective optical system, a first and second ocular systems, a first and second erecting optical systems and devices for varying an observation angle $\theta$ defined between the observation axes of the first and second ocular systems.

1 Claim, 8 Drawing Figures

F I G. 3
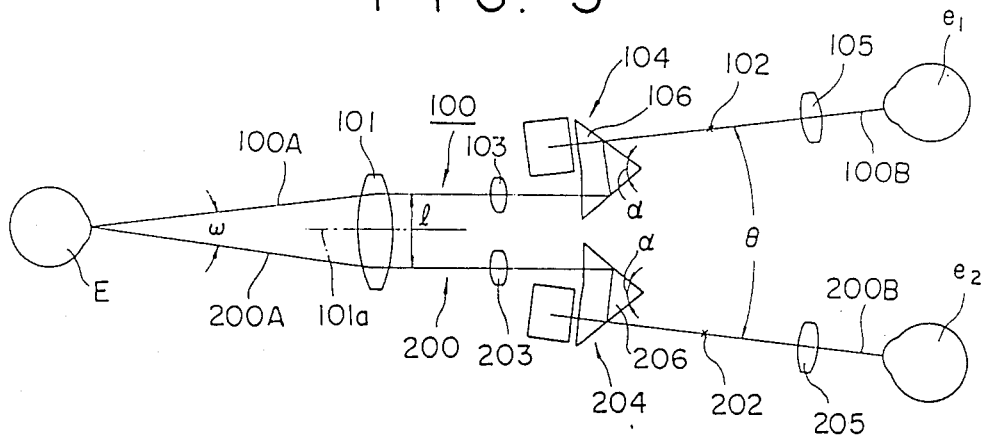

STEREO-MICROSCOPE WITH TWO OBSERVATION OPTICAL SYSTEMS EACH INCLUDING A RIGHT ANGLE PRISM AND A ROOF RIGHT ANGLE PRISM PROVIDING BOTH ROTATION AND RELATIVE SEPARATION ADJUSTMENTS

CROSS REFERENCE TO RELATED APPLICATIONS

The present application is a continuation of U.S. application Ser. No. 637,503, filed Aug. 1, 1984 now U.S Pat. No. 4,601,550.

BACKGROUND OF THE INVENTION

This invention relates to an optical constitution of a stereo-microscope and more particularly to an optical constitution of an ophthalmological slit lamp stereo-microscope.

The optical type of a stereo-microscope is largely classified into the Greenough type or the Galileo type. The Greenough type is, as shown in FIG. 1, constituted as such that two optical paths I,II are crossed on a plane of an object to be observed at an included angle $\omega$. The optical paths I,II have objective lens systems 1a, 1b, erecting optical systems 2a, 2b and ocular systems 3a, 3b, respectively, and are constituted as such that an incident optical axis IA toward the objective lens is parallel to an observation optical path IB of the ocular (likewise, in the optical path II, the incident optical axis IIA is parallel to the observation optical axis IIB). In this case, the included angle $\omega$ is set to be a convergent angle somewhere between from 10° to 16° which is very close to natural sighting, when an observer's naked eyes $e_1$, $e_2$ observe the object E from a near distance without using a microscope. Therefore, the Greenough type microscope has such an advantage as that a natural stereoscopic sighting can be obtained, since the included angle $\omega$ (hereinafter referred to as a stereo angle) defined between the incident optical axes IA, IIA toward the objective lens is equal to the included angle $\theta$ (hereinafter referred to as an observation angle) defined between the observation optical axes IB, IIB of the ocular systems 3a, 3b and the stereo angle $\omega$ is formed to be equal to the convergent angle of a natural sighting. However, it had such disadvantages that since the optical paths I, II are crossed, machining for mounting optical parts are complicated, and the constitution of the focussing and variable power optical systems (not shown) which are normally arranged between the objective lens system 1a, (1b) and the erecting optical system 2a, (2b) are also complicated.

On the other hand, the Galileo type stereo-microscope is, as shown in FIG. 2, constituted as such that the optical paths are parallel to the optical axis, respectively. The optical path III comprises an objective lens system 4, an imaging lens system 7a for producing an intermediate image Pa and an ocular system 6a for observing the intermediate image Pa. The optical path IV has the objective lens system 4 as a common objective lens and comprises an imaging lens system 7b, an erecting optical system 5b and an ocular system 6b same as in the case mentioned with regard to the optical path III. The optical axes of the both imaging systems 7a, 7b are parallel with respect to each other and also parallel to the optical axis 4a of the objective lens system 4. The observation optical axes IIIB, IVB of the ocular systems 6a, 6a are likewise , constituted to be parallel with respect to the axes of the imaging lens systems 7a, 7b. The stereo angle $\omega$ defined between the incident optical axes IIIA, IVA toward the objective lens system 4 is decided depending on the base length 1 which is defined by the distance between the imaging lens systems 7a, 7b. Because of the parallax due to this stereo angle $\omega$, the object E can be observed stereoscopically, although the observation angle $\theta$ defined between the observation axes IIIB, IVB is 0. The Galileo type stereo-microscope had such advantages as that since the two optical paths III, IV are parallel with respect to each other as mentioned above, the constitution of the optical system is simple, the constitution of the focussing structure and variable power structure is simple, and attached optical paths such as, for example, a camera optical system and a side observation scope can be comparatively easily added.

Generally speaking, human eye does not have a convergence between the lines of sight of the both eyes when it is in the far distance sighting state, and can be maintained in comfortable observation state with less fatigue and without accomodation of the crystalline lens. This is also true with respect to a microscopic observation. It is said that the Galileo type microscope in which the both observation optical axes IIIB, IVB are arranged to be parallel with respect to each other is advantageous when used for a long time observation compared with the Greenough type microscope in which the both axes are convergent with respect to each other since the former is less fatiguing during observation.

However, a microscope is a device for enlarging and observing a tiny object placed in a near position. In the Galileo type microscope, although the luminous flux is entered into the eye as if it were entered from an infinite far distance, optically, the human brain has a preliminary information that it is looking a near object. Therefore, it had such a disadvantage as that there is a gap between the natural sense of sighting and the optical sense of sighting. Particularly, due to the information of the convolution motion, or due to the observation of parallax caused by the stereo angle $\omega$ without the presence of the convergence motion information, the observer had an unnatural stereoscopic sighting stronger than normal stereoscopic sense.

Furthermore, in the case of, for example, a stereo-microscope of a slit lamp which is used in the ophthalmological field, a doctor is often required to observe the eyes to be observed with the naked eye in order to adjust, for example, the illumination position, the width and length of the slit, or to conduct a simple operational treatment, the doctor's observation eye is put in a near range sighting state. Then, the doctor has to look through the microscope and diverges the eye so that it becomes in a far range sighting state for observing the object stereoscopically. However, there was such disadvantage as that instant image separation and stereoscopic sighting were difficult to be effected.

The exaggeration of a stereoscopic sense and the necessity of effecting the divergence motion from the naked eye sighting to the stereoscopic sighting deny the littleness of the observation fatigue hitherto advocated with regard to the Galileo type stereo-microscope. On the contrary, the observation fatigue is found to be greater than the Greenough type microscope. In addition, there found to be such disadvantages as, for example, incorrect observation, or mis-treatment due to erroneous recognition of the actual distance. All these disadvantages with respect to the Galileo type microscope are remained yet to be solved in spite of the afore-mentioned advantages it has.

On the other hand, in the Greenough type microscope, although it had such advantage as that the object can be observed in the same stereoscopic sighting as that with respect to the near sighting with the naked eye even under the microscopic observation as mentioned above, when it is required to observe a very small unevenness, there are instances where it is difficult to observe such unevenness with the stereoscopic sense which is close enough to the natural sighting. Therefore, there was a request to strengthen the stereoscopic sense with regard to the Greenough type microscope.

SUMMARY OF THE INVENTION

The present invention is accomplished in order to eliminate the above-mentioned disadvantages and also to meet with the request with regard to the conventional stereo-microscope.

In order to achieve the above object and others there is essentially provided a stereo-microscope comprising a common objective lens system, a first and a second imaging lens system having optical paths parallel to that of the objective lens system and producing intermediate images of an object to be observed, a first and a second optical path deflecting means arranged behind said respective imaging lens systems for deflecting the respective ejection bundle of rays outwardly with respect to the optical path of said objective lens system and a first and second ocular systems arranged behind said respective optical path deflecting means for observing the respective intermediate images, characterized in that a stereo angle $\omega$ which is to be decided depending on the base length between said first and second imaging lens systems and an observation angle $\theta$ which is defined between the observation optical paths of said first and second ocular systems are equal.

There is also provided a stereo-microscope comprising an objective optical system for producing a first and second intermediate images of an object to be observed, a first and second ocular systems for observing said first and second intermediate images, respectively, a first and a second erecting optical system arranged in front of said first and second ocular systems such that said intermediate images can be observed as erecting images, and means for varying an observation angle $\theta$ defined between the observation optical axes of said first and second ocular systems so that the stereoscopic observation sense of an observer can be varied.

BRIEF DESCRIPTION OF THE DRAWING

The novel features and advantages of the present invention will become more apparent from the following description and claims when read together with the accompanying drawings wherein:

FIG. 3 illustrates the optical arrangement showing the first embodiment of the present invention;

DETAILED DESCRIPTION OF THE EMBODIMENTS

Figure 1:
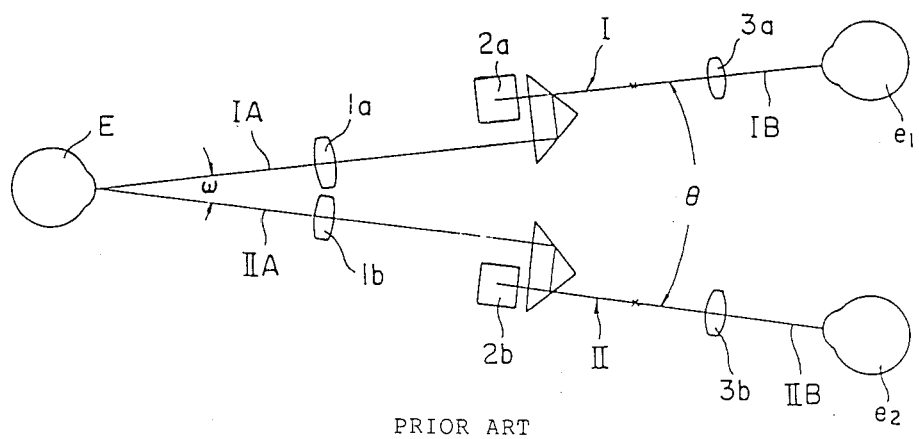
FIG. 1 illustrates the optical arrangement showing a conventional Greenough type stereo-microscope.

Preferred embodiments of the present invention will be described hereunder with reference to the accompanying drawings wherein like numerals denote like or corresponding parts throughout.

FIG. 3 illustrates the optical arrangement of a stereo-microscope of a slit lamp as an example. This stereo-microscope is constituted with a first optical path 100 and a second optical path 200. The first optical path 100 comprises a common single objective lens system 101, an imaging lens system 103 for producing an intermediate image 102 and having its optical axis parallel to the optical axis 101a of said, single objective lens system 101, a modified Porro prism as an erecting optical system which serves to deflect the optical path and an ocular lens system 105 for observing the intermediate image 102. On the other hand, the second optical path 200 comprises the, single objective lens system 101, an imaging lens 203 for producing an intermediate image 202 and having its optical path parallel to the optical axis 101a of said single objective lens system 101 and a modified Porro prism 204 as an erecting optical system which serves to deflect the optical path and an ocular lens system 205 for observing the intermediate image 202.

The respective apical angle $\alpha$ of prisms 106, 206 constituting the modified Porro prisms 104, 204 are arranged to be $90° - \omega/4$ $\omega$ is a stereo angle defined between an incident optical axis 100A of the first optical path 100 and an incident optical axis 200A of the second optical path 200 toward the object E which is decided depending on the base length l between the two imaging lenses 103 and 203. Because of the relationship between said $\alpha$ and $\omega$, an observation angle $\theta$ defined between the observation optical axis 100B of the first optical path 100 and the observation optical axis 200B of the second optical path 200 is constituted to be equal to the stereo angle $\omega$.

The following test results proved the fact that when the stereo angle $\omega$ and the observation angle $\theta$ are constituted to be equal, an observation sense which is closest enough to the natural stereoscopic sense can be obtained.

Figure 4:
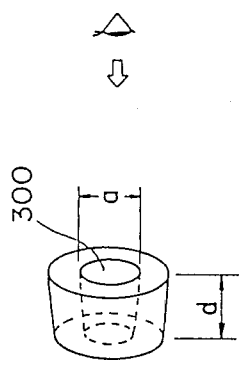
FIG. 4 is a perspective view of the object to be observed which was used for a stereoscopic test.

As shown in FIG. 4, the test was carried out as such that an object of a hollow cylindrical member 300 having an inner diameter a=2.0 mm and a depth d=2.0 m/m (depth/inner diameter=1) was subjected to the observation with the naked eye of 10 persons shown in Table 1 and thereafter said object was subjected to the observation of the 10 persons using 5 different kinds of stereo-microscopes shown in Table 2. The 10 persons were requested to answer in five grades evaluation from 1 to 5 whether the ratio between the inner diameter a and the depth d under each kind of microscopic observation was larger or smaller compared with that observed with the naked eye. In this case, numeral 3 represents the equal degree as that observed with the naked eye. The numerals 4 and 5 represent the stronger stereoscopic sense, i.e., the larger ratio of the depth/the inner diameter, and the numerals 2 and 1 represent the reversed fashion, i.e., the smaller ratio of the depth/the inner diameter. The results are shown in Table 3.

TABLE 1

| OBSERVER | SEX | AGE | RACE |
|---|---|---|---|
| A | ♂ | 31 | JAPANESE |
| B | ♂ | 32 | " |
| C | ♂ | 35 | " |
| D | ♂ | 40 | " |
| E | ♂ | 45 | " |
| F | ♂ | 45 | " |
| G | ♂ | 45 | " |
| H | ♂ | 50 | " |
| I | ♂ | 30 | AMERICAN (WHITE) |
| J | ♀ | 22 | JAPANESE |

TABLE 2

| KIND | TYPE | STEREO ANGLE ω | OBSERVATION ANGLE θ | OBSERVATION MAGNIFICATION |
|---|---|---|---|---|
| NO. 1 | GREENOUGH | 13° | 13° | 16× |
| NO. 2 | GALILEO | 13° | 0 (PARALLEL) | 16× |
| NO. 3 | INVENTION (GALILEO) | 13° | 8° | 16× |
| NO. 4 | INVENTION (GALILEO) | 13° | 13° | 16× |
| NO. 5 | GREENOUGH | 13° | 0 (PARALLEL) | 16× |

Remark: The above NO. 3 INVENTION (GALILEO) means the present invention of a Galileo type.

TABLE 3

| OBSERVER | KIND | | | | |
|---|---|---|---|---|---|
| | NO. 1 | NO. 2 | NO. 3 | NO. 4 | NO. 5 |
| A | 3 | 5 | 4 | 3 | 5 |
| B | 3 | 5 | 4 | 3 | 5 |
| C | 3 | 5 | 3 | 3 | 5 |
| D | 3 | 5 | 4 | 3 | 5 |
| E | 3 | 5 | 3 | 3 | 5 |
| F | 3 | 5 | 3 | 3 | 5 |
| G | 3 | 5 | 4 | 3 | 5 |
| H | 3 | 5 | 4 | 3 | 5 |
| I | 3 | 5 | 3 | 3 | 5 |
| J | 3 | 5 | 3 | 3 | 5 |
| AVERAGE | 3 | 5 | 3.5 | 3 | 5 |

As apparent from the results shown in Table 3, the observers' stereoscopic sense is most intimately related to the observation angle θ; the smaller the observation angle θ, the stronger the stereoscopic sense regardless of whether the microscope of the present invention, Galileo type, or Greenough type is used. Also, it is confirmed with regard to the both types that when the stereo angle ω and the observation angle θ are equal, a natural stereoscopic sense like that observed with the naked eye can be obtained.

As described in the foregoing, according to the above embodiment, since the optical axes of the imaging lens systems 103, 203 remain parallel with respect to each other, a variable power optical system and a focussing optical lens system (the imaging lens system may serve as this) as well as the driving mechanism thereof, all of which are arranged at the front or back of said imaging lenses 103, 203 can be constituted simply compared with the Greenough type microscope. Furthermore, it has not only an advantage which the Galileo type stereo-microscope has, i.e., attaching optical systems such as a camera optical system and the like can be mounted simply, but also an advantage which the Greenough type stereo-microscope has, i.e., a microscope observation without losing a natural observation sense can be obtained as in the case when observed with the naked eye, thus achieving a new Galileo type stereo-microscope.

In the above first embodiment, the stereo angle ω and the observation angle θ are arranged to be equal. However, the observation angle θ may be varied in the both Greenough type and the Galileo type stereo-microscopes so that the stereoscopic sense under the microscopic observation can be greater or smaller than the one observed with the naked, eye, where necessary.

Figure 2:
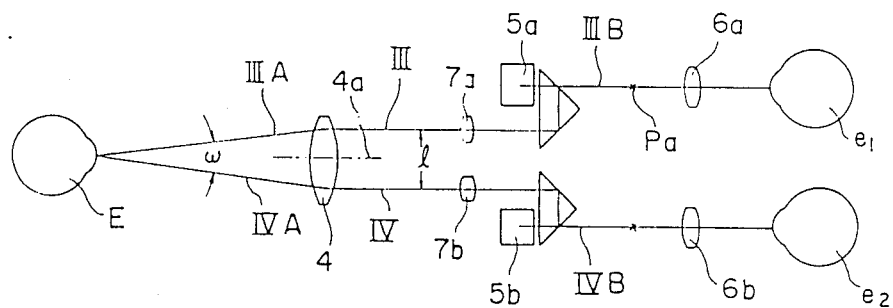
FIG. 2 is the optical arrangement showing a conventional Galileo type stereo-microscope.
Figure 5:
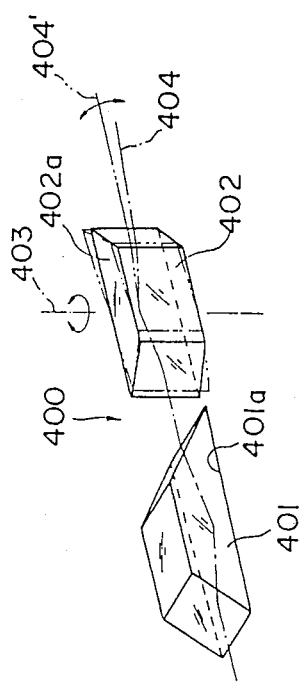
FIG. 5 is the second embodiment of the present invention wherein the second embodiment is shown by way of only an erecting optical system of one of the optical paths.

FIG. 5 illustrates an embodiment of the present invention having such observation angle adjusting means which is the means for deflecting the optical path of the both types shown in FIGS. 1 and 2, and shows a modified embodiment of an erecting optical system by way of only one optical path of the erecting optical system. An erecting optical system 400 as means for deflecting the optical path comprises two Dove prisms 401 and 402. The reflection plane 402a of the second Dove prism 402 is arranged to be parpendicular with respect to the reflection plane 401a of the first Dove prism 401. The erecting optical system is constituted as such that the reversing image can be observed as an erecting image by means of said both Dove prisms. Furthermore, it has means for adjusting the observation angle by rotating the second Dove prism 402 around a rotary axis 403 so that the observation optical axis 404 can be moved within a horizontal plane and is constituted as such that a varied stereoscopic sense can be obtained by varying the observation angle θ.

Figure 6:
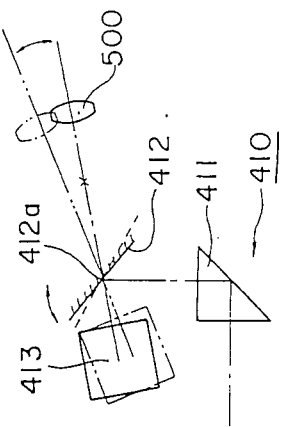
FIG. 6 illustrates the third embodiment of the present invention wherein the third embodiment is shown by way of an erecting optical system of one of the optical paths only.

FIG. 6 illustrates another embodiment for varying the stereoscopic sense. An erecting optical system 410 as means for deflecting the optical path of one optical path comprises a first right angle prism 411, a rotary mirror 412, and a second right angle prism 413 having a ridgeline within a plane perpendicular to the ridgeline of the first right angle prism 411 and has such means for adjusting the observation angle in such a manner as that the rotary mirror 412 and the second right angle prism 413 can be rotated around a rotary axis 412a integrally with an ocular 500. With such constitution, the observation angle θ is varied so that a varied stereoscopic sense can be obtained.

Figure 7:
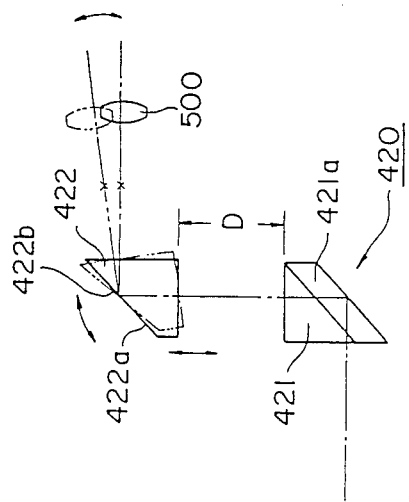
FIG. 7 is the fourth embodiment of the present invention wherein the fourth embodiment is shown by way of only an erecting optical system of one of the optical paths.

FIG. 7 illustrates another embodiment for varying the stereoscopic sense. An erecting optical system 420 as means for deflecting the optical path of one optical path comprises a roof right angle prism 421 having a roof plane 421a, and a second right angle prism 422. Said second right angle prism 422 is constituted with means for adjusting the observation angle so that it can be rotated integrally with the ocular 500 around a rotary axis 422b within the reflection plane 422a. With such constitution, the observation angle $\theta$ is varied so that a varied stereoscopic sense can be obtained. Furthermore, the distance D between the second right angle prism 422 and the roof right angle prism 421 can be varied so that the observation optical system can be adjusted in accordance with the distahce between the observer's pupils.

The above-mentioned means for adjusting the observation angle can be applied not only to the embodiment in FIG. 3 but also to the Greenough type stereo-microscope in FIG. 1 and the Galileo type stereo-microscope in FIG. 2. In such cases, the objective lens system and the imaging lens system are commonly used with regard to the Greenough type, and the objective optical system comprises a first objective lens system 1a for producing the first intermediate image and a second objective lens system 1b for producing the second intermediate image and said first and second objective lens systems 1a, 1b are crossed with respect to the optical axes in order to define a stereo angle $\omega$.

As described in the foregoing, when a stereo-microscope having means for adjusting the observation angle in FIGS. 5 to 7 is used, a stereoscopic sense under a microscopic observation can be freely chosen and it is very convenient for a stereoscopic observation.

Figure 8:
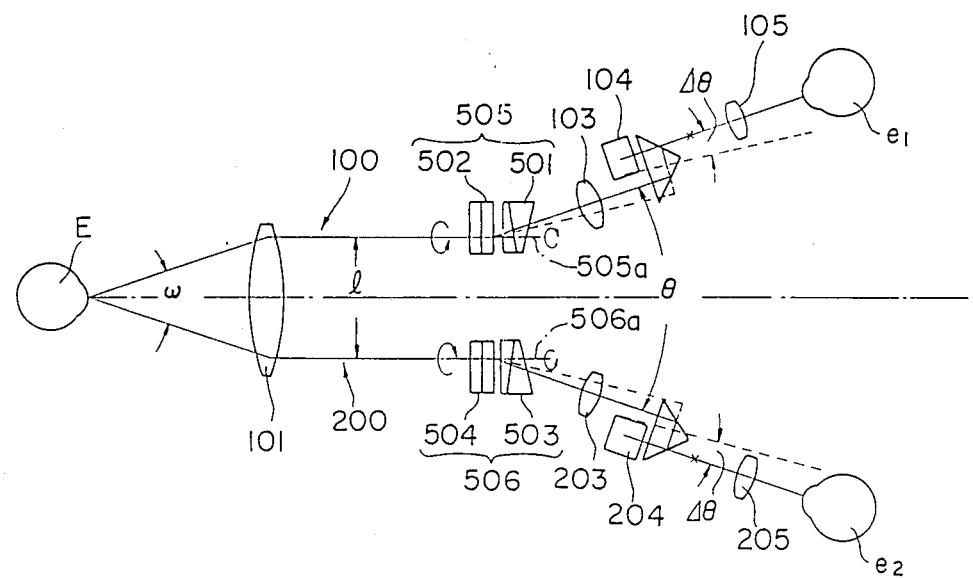
FIG. 8 is the optical arrangement showing the fifth embodiment of the present invention.

Furthermore although the above-mentioned embodiments use a reflection plane in order to obtain the observation angle $\theta$, the present invention is not limited to it. Alternatively, the refraction action of a prism can be used. FIG. 8 illustrates such one example, wherein a deflection prism 505 is arranged between the objective lens 101 and the imaging lense 103 of the first optical path 100 and a deflection prism 506 is likewise arranged between the objective lens 101 and the imaging lens 203 of the second optical path 200 in order to obtain an observation angle $\theta$. According to this embodiment, the deflection prism 505 is constituted with a rotary prism comprising achromatic tiny prisms 501 and 502. These employ rotary prisms which are rotated in the opposite direction and in the same amount, respectively, around a rotary axis 505a. The deflection prism 506 is likewise constituted with a rotary prism comprising achromatic tiny prisms 503, 504. When the rotary prisms as means for adjusting the observation angle are activated, the observation angle $\theta$ is varied. In this case, the ocular systems arranged at the right and left sides after the imaging lenses 103, 203 move with rotary prisms in such a manner that their crossing angle changes with the observation angle $\theta$, so that no axial inconsistency takes place.

While the present invention has been particularly shown and described in its preferred forms with certain degree of particularity, it will be understood by those skilled in the art that the foregoing and other changes may be made without departing from the spirit and the scope of the invention as hereinafter claimed.

What is claimed is:

1. A Galileo type stereo-microscope comprising:

a common objective lens systems with a stereo angle ($\omega$) defined as an angle between light rays entering through the common objective lens, from an incident optical axis of a first optical path and an incident optical axis of a second optical path, said first and second optical axes extending toward an object to be observed, respectively;

first and second imaging lens systems, each having an optical axis parallel to that of said objective lens system, and producing first and second intermediate images of the object to be observed, respectively;

a first observation optical system for observing the first intermediate image, including a first optical path deflecting means and a first ocular lens system having an optical axis which is coincident with an ejection optical axis of said first optical path deflecting means;

a second observation optical system for observing the second intermediate image and including second optical path deflecting means and a second ocular lens system having an optical axis which is coincident with an ejection optical axis of said second optical path deflecting means;

said first and second optical path deflecting means each comprising at least one fixed reflection surface and at least one rotatable reflection surface which can be rotated around a rotary axis which is perpendicular to a plane including optical axes of said first and second ocular lens systems; and said first and second optical path deflecting means each serving also as an erecting optical system for erecting the respective intermediate image and each including a roof right angle prism having said fixed reflection surface and a right angle prism having said rotatable reflection surface, said roof right angle prism having a reflection optical axis, and said right angle prism and said roof right angle prism being constituted such that a space therebetween is variable in a direction along the reflection optical axis of the roof right angle prism; and means for varying an observation angle ($\theta$) which is defined by an intersected angle between said axes of said first and second ocular lens systems by rotating inwardly or outwardly together said rotatable reflection surfaces with said ocular lens systems of said observation optical systems around said rotary axis, whereby, said observation angle ($\theta$) can be different from said stereo angle ($\omega$) so that the stereoscopic sense under the microscopic observation can be greater or smaller than the one under the naked eye observation.

* * * * *